United States Patent [19]

Börjesgård et al.

[11] 4,237,823
[45] Dec. 9, 1980

[54] FLUIDIZED BED COMBUSTION CHAMBER

[75] Inventors: Pehr Börjesgård, Finspong; Anders Kullendorff, Aby; Jan Wikner, Finspong, all of Sweden

[73] Assignee: Stal-Laval Turbine AB, Finspong, Sweden

[21] Appl. No.: 9,571

[22] Filed: Feb. 5, 1979

[30] Foreign Application Priority Data

Feb. 13, 1978 [SE] Sweden ................................. 7801616

[51] Int. Cl.³ ............................................... F22B 1/00
[52] U.S. Cl. ..................................... 122/4 D; 110/263
[58] Field of Search ................ 122/4 D; 110/245, 263

[56] References Cited

U.S. PATENT DOCUMENTS

| | | | |
|---|---|---|---|
| 2,818,049 | 12/1957 | Blaskowski et al. ................. | 122/4 D |
| 4,095,534 | 6/1978 | Goidich ................................ | 110/263 |
| 4,096,909 | 6/1978 | Jukkola ................................ | 122/4 D |

*Primary Examiner*—Henry C. Yuen
*Attorney, Agent, or Firm*—Pollock, Vande Sande & Priddy

[57] ABSTRACT

A fluidized bed combustion chamber adaptable for use with relatively large gas turbines and the like, wherein a substantially spherically-shaped outer casing encloses an annular fluidized bed combustion chamber which is mounted on a double bottom air distribution box. A cleaning assembly is positioned within the fluidized bed and the entire combustion chamber is supported on a base plate which extends through the casing and into contact with the box. Compressed air enters the spherical casing, is directed through a pair of cooling gaps, is caused to enter the air distribution box and then passes through the fluidized bed.

11 Claims, 2 Drawing Figures

FLUIDIZED BED COMBUSTION CHAMBER

BACKGROUND OF THE INVENTION

The present invention relates generally to combustion chamber assemblies of the type employed with relatively large gas turbines and the like. In particular, the present invention is directed to a substantially spherically-shaped outer casing enclosing an annular fluidized bed combustion chamber and further enclosing a cleaning assembly adaptable for cleaning heated combustion gases emitted from the fluidized bed prior to contact with the turbine assembly.

Fluidized bed combustion chambers are particularly adaptable for use with large gas turbines, because the fluidized bed assembly can easily be maintained at relatively high temperatures through the use of a variety of fuel sources. While fluidized bed combustion chambers have been used in the prior art, known assemblies have proven less than completely satisfactory in the excessive amount of material required in the construction of the fluidized bed in order to withstand forces generated by the pressurized gas flowing therethrough. Another problem confronting known combustion chambers is the formation of relatively serpentine air flow passages through the combustion chamber whereby the heated combustion gases tend to significantly cool in temperature prior to passage through the turbine assembly. A related problem of such combustion chambers is the tendency to overheat certain portions of the chamber casing via direct contact with the heated combustion gases, which can lead to premature failure of the casing during prolonged use.

As will be discussed in detail hereafter, applicant's invention provides a compact fluidized bed combustion chamber which overcomes the aforestated problems, while also providing an effective device for supplying heated combustion gases for use in large gas turbines and the like, wherein almost any type of fuel can be used within the fluidized bed.

OBJECTS AND SUMMARY OF THE PRESENT INVENTION

An object of the present invention is to provide a combustion chamber including a substantially spherically-shaped outer casing which encloses a substantially annularly-shaped fluidized bed and which further encloses an assembly for cleaning debris, ashes and the like from the heated gases upon exit from the fluidized bed.

A further object of the present invention is to provide a symmetrically-shaped combustion chamber which includes a fluidized bed having a cross-section which is substantially conical in shape.

Another object of the present invention is to provide a combustion chamber wherein the outer casing and the fluidized bed are both supported by a base plate assembly which extends through the casing and is attached to an air distributing box upon which the annular, fluidized bed is mounted.

Each of the above-stated objects is achieved in a preferred embodiment of the present invention, wherein a combustion chamber is constructed with a substantially spherically-shaped outer casing. A double-bottom air distributing box is positioned within the casing, with both the fluidized bed and the cleaning assembly mounted on the box. A base plate assembly entends from the box, through the casing wall and serves to support the casing, fluidized bed and cleaning assembly in a fixed position relative to a support floor or the like.

The fluidized bed is substantially conical in cross-section and spaced from an inner wall of the casing to form an air flow passage therebetween. An output portion of the fluidized bed is connected to an input portion of the cleaning assembly, which in itself makes up no part of the present invention. A valve assembly is positioned in the air distributing box to control the flow rate of a compressed gas, such as air, into the box and fluidized bed mounted thereon.

During operation, compressed air is introduced into the spherical casing and is caused to flow into the air-distributing box. The compressed air then travels into the fluidized bed, where it interacts with the fluid source to create hot combustion gases. The heated combustion gases exit from the fluidized bed and are directed through the cleaning assembly to remove ashes, debris and the like which may be picked up during the combustion process. Finally, the heated combustion gases flow out of the casing and into contact with a gas turbine and the like.

It is noted that either cooling or boiling tubes may be positioned within or above the fluidized bed, making the combustion chamber adaptable for use with combined steam and gas turbine plants. Furthermore, by using substantially radially extending tubes within the annularly-shaped fluidized bed, it is possible to obtain excellent heating symmetry within the combustion chamber.

The present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein.

DETAILED DESCRIPTION OF THE PRESENT INVENTION

Figure 1:
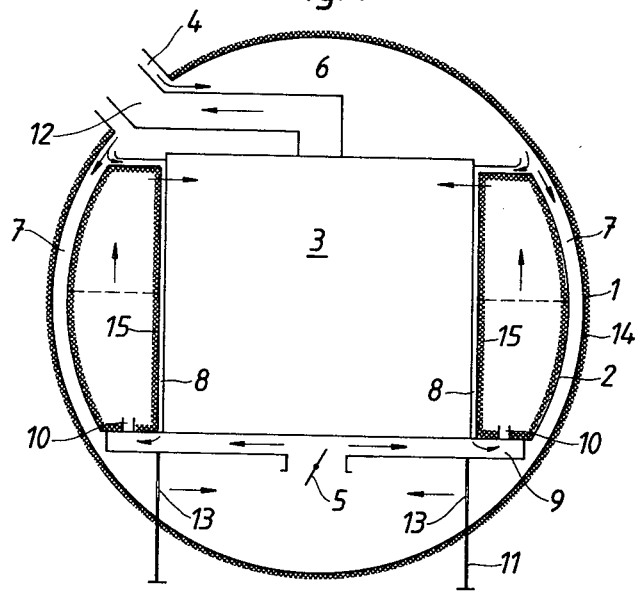
FIG. 1 shows a cross-sectional view through a combustion chamber formed in accordance with the present invention.

Referring to the drawings, and FIG. 1 in particular, a cross-section of a fluidized bed combustion chamber is shown. The combustion chamber includes a substantially spherically-shaped outer casing 1, which encloses a substantially annularly-shaped fluidized bed 2. Positioned within fluidized bed 2 is a cleaning assembly designated generally at 3 which includes conventional cleaning devices for separating solid particles of ash and the like from the heated combustion gases existing from fluidized bed 2.

A compressed gas, such as air, enters outer casing 1 through an inlet generally indicated at 4, with the air filling an upper space 6 within outer casing 1. A portion of the air then flows through a cooling gap 7 created between confronting surfaces of annular fluidized bed 2 and spherical casing 1, while a further portion of the air flows through a relatively narrow cooling gap 8 created between confronting surfaces of fluidized bed 2 and cleaning assembly 3. It is to be noted that the different portions of casing 1, bed 2, and cleaning assembly 3 which form gaps 7 and 8 are constructed such that the air tends to maintain a substantially constant speed while flowing through gaps 7 and 8, respectively, which ensures even cooling on both sides of the fluidized bed 2.

Both the fluidized bed 2 and cleaning assembly 3 are mounted on a double-bottom air distributing box 9 which extends substantially between opposite sides of outer casing 1. Box 9 is constructed with a centrally disposed aperture extending through a wall portion facing away from cleaning assembly 3 as shown in FIG. 1. Mounted in the aperture is a valve assembly 5 which can be adjusted to control the amount of air introduced into air distributing box 9. A plurality of separate apertures 10 may be formed through abutting surfaces of box 9 and fluidized bed 2, with the apertures being substantially evenly spaced throughout the abutting surfaces to allow the air to flow from box 9 into fluidized chamber 2. It is also within the scope of the present invention to construct air nozzles between box 9 and fluidized bed 2 similar to the nozzles suggested in German Offenlegungsschrift No. 2,743,030.

A base plate 11 is attached to air distributing box 9 and extends through outer casing 1, with base plate 11 providing the entire support for the combustion chamber assembly. A plurality of apertures 13 have been formed in portions of the base plate 11 located between casing 1 and box 9 to allow the air from gap 7 to enter the combustion chamber. Referring to FIG. 1, it is noted that fluidized bed 2 is formed with a substantially conical cross-sectional shape which significantly reduces the speed of the air flowing through bed 2 to ensure proper heating of the material within bed 2.

The uniquely constructed spherical casing 1, box 9 and base plate 11 ensures that the pressure within the combustion chamber is taken up from the casing 1. This means that the walls of the fluidized bed 2 as well as the walls of the cleaning assembly 3 need only be dimensioned to withstand a conventional drop in pressure which occures during operation. Because fluidized bed 2 and box 9 are directly supported by base plate 11, neither gravitational forces nor thermal expansion forces can interrupt the air flow path formed therebetween.

Returning again to FIG. 1, after the heated combustion gases exit from fluidized bed 2, they are caused to flow through a conventional cleaning assembly 3, wherein the gases are cleaned in a conventional manner which in itself makes up no part of the present invention. The heated and cleaned gases exit from casing 1 through an outlet tube 12 which may be coaxially arranged within inlet 4. To ensure a substantially uniform temperature distribution within the walls of the combustion chamber, insulation 14 is mounted on an outside wall of casing 1, while insulation 15 is mounted on both the inside and outside walls of the fluidized bed 2. As a result, walls of bed 2 and casing 1 will substantially maintain the same temperature as the incoming gas.

Figure 2:
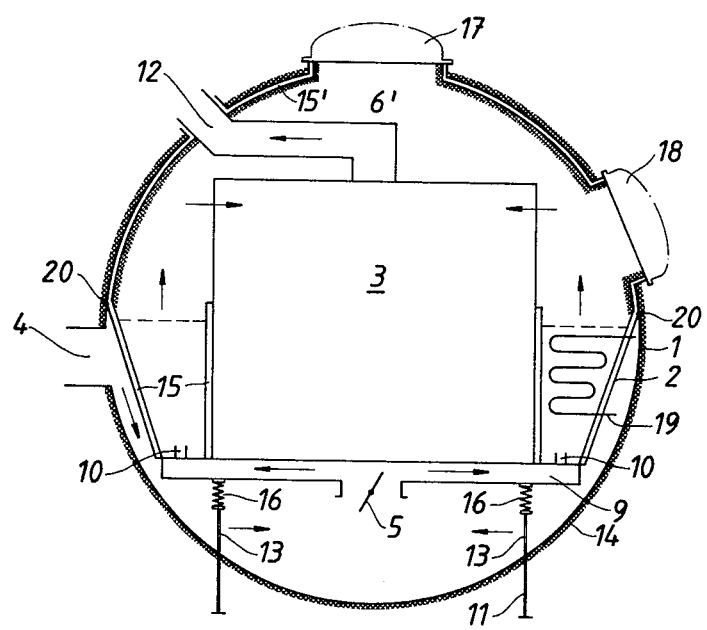
FIG. 2 shows a cross-sectional view through a further combustion chamber formed in accordance with the present invention.

FIG. 2 shows a further embodiment of the present invention, wherein a fluidized bed 2 includes an open end portion which is in direct fluid communication with an upper space 6' within casing 1. Outer edge portions of fluidized bed 2 are attached to casing 1 along a line 20, which subdivided the volume within casing 1 into separate chambers. A gas intake aperture 4 extends through casing 1 and is positioned on an opposite side of fluidized bed 2 from space 6'. It is also noted than an outer side portion of fluidized bed 2 is made even more saliently conical in cross-sectional shape as compared to the shape of the fluidized bed 2 disclosed in the preceding embodiment.

Resilient elements 16 have been inserted between base plate 11 and air distributing box 9 to reduce the adverse affect of any thermal stresses which may arise due to the construction of the combustion chamber. A pair of inspection doors 17 and 18 are attached to outer casing 1 and cover apertures formed therethrough.

Compressed air is introduced through inlet 4 and flows through air distributing box 9 and apertures 10 into fluidized bed 2. Because the fluidized bed 2 is open at an upper end thereof, space 6' will be heated by a portion of the gas exiting from bed 2. Therefore, additional insulation 15' has been attached to that inner surface of casing 1 which forms a boundary for space 6'. After the heated combustion gas flows from fluidized bed 2, it passes through cleaning assembly 3 and exits via output tube 12.

A bundle of radially directed cooling tubes 19 may extend through fluidized bed 2 to either heat or cool a gas flowing therethrough. By locating cooling or boiling tubes 19 within or above fluidized bed 2, the combustion chamber is adaptable for use with combined steam-gas-turbine plants. In a preferred embodiment of the present invention, a gas, such as air, having a working pressure of 10 to 15 bar may be employed when the outer casing has a diameter of 10 to 15 m.

The present invention is not intended to be limited to the above-described embodiments, but is to be limited only by the scope of the following claims.

We claim:

1. A pressurized combustion chamber assembly adaptable for providing hot combustion gases to gas turbines and the like, and comprising:

a hollow outer casing having a shell-like configuration and including inlet and outlet apertures extending therethrough;

a hollow, box-like gas distribution assembly positioned within said hollow casing and supporting a substantially annularly-shaped fluidized bed combustion chamber mounted thereon;

valve assembly means mounted in an opening formed through a wall of said box-like gas distribution assembly facing away from said fluidized bed combustion chamber, said valve means being selectively actuable for adjusting the size of said opening to control the flow of a compressed gas into said distribution assembly via said opening;

inlet aperture means extending through abutting wall surfaces of said box-like gas distribution assembly and said fluidized bed combustion chamber for providing the only entrance allowing said compressed gas to flow from said distribution assembly into said fluidized bed combustion chamber, and outlet aperture means extending through a further wall portion of said fluidized bed combustion chamber for allowing heated combustion gas to leave said combustion chamber;

gas flow means for conveying a quantity of relatively cool compressed gas from said inlet aperture to said box-like distribution assembly, said gas flow mans comprising at least one coolling gap defined by an outer wall surface of said fluidized bed combustion chamber and a confronting inner wall surface of said outer casing, wherein said relatively cool compressed gas flowing through said at least one gap cools the adjacently disposed outer wall surface of said fluidized bed combustion chamber prior to entering said opening of said box-like distribution chamber; and support means extending from said box-like distribution assembly through openings formed in said outer casing and into contact with a support surface for providing the entire support for said combustion chamber assembly relative to said support surface.

2. A combustion chamber according to claim 1, wherein said outer casing is substantially spherical in shape and said inlet opening is located in a vertically upper portion of said casing.

3. A combustion chamber according to claim 1, wherein said inlet aperture means comprises a plurality of separate apertures each extending through abutting surfaces of said box-like assembly and said fluidized bed mounted thereon.

4. A combustion chamber according to claim 1, wherein a gas cleaning assembly means is positioned within said annular fluidized bed and is mounted on said box-like gas distribution assembly for cleaning debris and the like from said heated combustion gases after exiting from said fluidized bed.

5. A combustion chamber according to claim 4, wherein said gas flow passage means further comprises a second cooling gap formed between an inner wall surface of said fluidized bed and a confronting outer wall surface of said gas cleaning assembly;

whereby a further portion of said relatively cool compressed gas flows from said inlet aperture, through said second cooling gap and enters said box-like assembly through a plurality of additional apertures extending therethrough with said further portion of said relatively compressed gas cooling the adjacently disposed inner wall surface of said fluidized bed.

6. A combustion chamber according to claim 1, wherein insulation is attached to an outer wall surface of said casing and further insulation is attached to inner and outer wall surfaces of said fluidized bed to achieve an even temperature distribution throughout the walls of said casing and said fluidized bed, respectively.

7. A combustion chamber according to claim 1, wherein said fluidized bed is open at an upper vertical end portion to provide a direct fluid passageway between said fluidized bed and said casing.

8. A combustion chamber according to claim 1, wherein said fluidized bed is formed with a substantially conically-shaped cross-section to decrease the gas flow rate therethrough.

9. A combustion chamber according to claim 1, wherein said support means comprises a base plate assembly extending from the support surface, through said outer casing and into attachment with said box-like gas distribution assembly, with said outer casing being fixedly attached to said base plate.

10. A combustion chamber according to claim 9, wherein a plurality of apertures are formed in wall portions of said base plate located between said box-like distribution assembly and said outer casing for introducing gas into said combustion chamber.

11. A combustion chamber according to claim 9, wherein resilient, spring-like members are positioned between said base plate and said box-like gas distribution assembly to reduce the adverse effect of thermal stresses which arise during operation of the combustion chamber.

* * * * *